United States Patent [19]
Walters et al.

[11] Patent Number: 6,025,571
[45] Date of Patent: Feb. 15, 2000

[54] NOZZLE ASSEMBLY FOR LASER CUTTING HEAD

[75] Inventors: Jeffrey K. Walters; Barry F. Tyler, both of Bradenton, Fla.

[73] Assignee: American Torch Tip Company, Bradenton, Fla.

[21] Appl. No.: 09/115,997

[22] Filed: Jul. 15, 1998

[51] Int. Cl.[7] .......................... B23K 26/14; B23K 26/00
[52] U.S. Cl. .................. 219/121.67; 219/121.84
[58] Field of Search .................. 219/121.67, 121.84, 219/121.68, 121.72

[56] References Cited

U.S. PATENT DOCUMENTS

| | | | |
|---|---|---|---|
| 5,128,508 | 7/1992 | Klingel | 219/121.67 |
| 5,192,847 | 3/1993 | Jagiella et al. | 219/121.67 |

FOREIGN PATENT DOCUMENTS

| | | | |
|---|---|---|---|
| 294324 | 12/1988 | European Pat. Off. | 219/121.84 |
| 3637568 | 5/1988 | Germany | 219/121.84 |
| 60-49886 | 3/1985 | Japan | 219/121.84 |
| 2-165889 | 6/1990 | Japan . | |

*Primary Examiner*—Geoffrey S. Evans
*Attorney, Agent, or Firm*—Sughrue, Mion, Zinn, Macpeak & Seas, PLLC

[57] ABSTRACT

A nozzle assembly, for laser cutting heads, which includes a connection which easily, inexpensively, and removably connects a conductive insert to an insulating receptacle. A conductive nozzle can then be threaded into the conductive insert. The insulating receptacle includes holes through an annular cross section thereof. One hole receives a conductor pin having a head at one end and threads at the other. The other holes each have a larger diameter portion and a smaller diameter portion that receive a screw head, and a screw shaft, respectively. The screws and the threaded end of the conductor pin are then screw threaded into holes, which have complementary threads, in the conductive insert to connect the conductive insert to the insulating body. Such a connection thus allows damaged or worn parts to be easily replaced which thereby reduces cost of the nozzle assembly.

14 Claims, 2 Drawing Sheets

NOZZLE ASSEMBLY FOR LASER CUTTING HEAD

BACKGROUND OF THE INVENTION

The present invention relates to cutting heads and, more particularly, to nozzle assemblies for laser cutting heads which employ capacitance or like non-mechanical measurement to control the spacing of the nozzle from the surface of the workpiece.

For cutting workpieces, laser cutting machines have a laser cutting head with a nozzle at the end adjacent the workpiece. The laser cutting head includes a lens system which focuses the laser beam through an aperture in the nozzle. In order to obtain uniform cutting action, it is necessary for the focal point of the laser beam to be at an optimum distance from the surface of the workpiece. If the workpiece to be cut is not perfectly flat, it is necessary for the focal point of the beam and generally the entire laser cutting head, to be moved upwardly and downwardly to maintain the desired spacing of the focal point relative to the surface of the workpiece.

To effect precision movement of the head in this manner, it is necessary to have a system for measuring the distance between the surface of the workpiece and the nozzle. The distance between the workpiece and nozzle is readily determined by measuring variations in capacitance without mechanical contact. To be able to measure the capacitance, an electrically conductive nozzle must be supported in a non-conductive receptacle in the cutting head, and the electrically conductive nozzle must be connected by a conductor to the measuring instrument.

Because the nozzle is a part which must be periodically replaced, some prior devices have designed the nozzle and receptacle with complementary screw threaded surfaces. One nozzle assembly employing this type of construction has had a receptacle with an inner or female screw thread in which is engaged the outer or male screw thread of the nozzle. A conductive path is formed by a metallized coating on the screw thread of the receptacle, and it is connected by a wire in the receptacle to a conductive contact point on the side opposite the nozzle.

The disadvantage of this prior art structure is that the screw thread in the receptacle, which is usually of ceramic material, is relatively difficult to produce, and the metallizing of the threads is expensive and imprecise. Further, this screw thread is often very brittle and there is a problem in that the metal in the screw threads wears out and tears. This results in a poor electrical connection, or even a break in electrical connection, between the nozzle and the receptacle, thereby causing the measuring instrument to become no longer functional.

Moreover, it is difficult to manufacture a receptacle of insulating material with screw threads to close tolerances. To maintain good concentricity, surface finishes, and critical measurements, surfaces must be ground after the ceramic is fired. Grinding the ceramic is a costly process, and could prove to result in poor quality of operation in the laser cutting head.

Another previous device is disclosed in U.S. Pat. No. 5,128,508 to Hans Klingel, hereby incorporated by reference. The Klingel device attempts to solve the problems of the previous devices by including a conductive insert having a body portion of generally annular cross section with a central passage extending therethrough, wherein the wall of the passage is internally threaded. The threads of the conductive insert mate with complementary threads on a neck portion of a conductive nozzle. The conductive insert is adhesively bonded to an annular receptacle of insulating material. A conductive pin is soldered to the insert, and extends from the insert, through the receptacle to provide a conductive path from the nozzle to the cutting head.

However, the Klingel device suffers many disadvantages. The solder connecting the conductive pin to the conductive insert looses its hold under conditions of intense heat that are typical in such a device. Further, the glue connecting the conductive insert to the receptacle of insulating material breaks down, and looses its hold, after extended normal operating use, or after a relatively short use under high heat applications. Both a failure in the solder connection and a failure in the adhesive connection cause the conductive insert to come loose, thus causing the nozzle, which is connected to the conductive insert, to be out of center or fall out completely. Once the nozzle is out of center, the system will not function properly, and other damage could result. Needless to say, if the nozzle falls out completely, especially during operation of the laser, extensive damage could occur.

SUMMARY OF THE INVENTION

It is an object of the invention to reduce the cost of manufacturing, and improve the life, of a nozzle assembly.

It is a further object of the invention to reduce the cost of manufacturing, and improve the life, of a nozzle assembly for laser cutting heads by providing a simple way to removably attach a conductive insert to a receptacle of insulating material. The insulating receptacle is provided with holes for threaded screws. The heads of the screws seat in the insulating receptacle, whereas the shafts extend therethrough and thread into the conductive insert. A conductor pin extends through the insulating receptacle and is also threaded at its end in order to attach to the conductive insert. The nozzle assembly of the present invention gives multiple, easily removable, connections between the conductive insert and the insulating receptacle. With such connections, the conductive insert will not come loose under conditions of high intense heat, or prolonged heat from extended use. Also, the connection of the present invention allows replacement of only that portion of the nozzle assembly which is worn out or damaged. Further, the nozzle of the present invention is easily, and inexpensively, manufactured.

BRIEF DESCRIPTION OF THE DRAWINGS

The above and other objects and advantages of the present invention will become more apparent by describing in detail preferred embodiments thereof with reference to the accompanying drawings, in which.

DETAILED DESCRIPTION OF THE INVENTION

Figure 1:
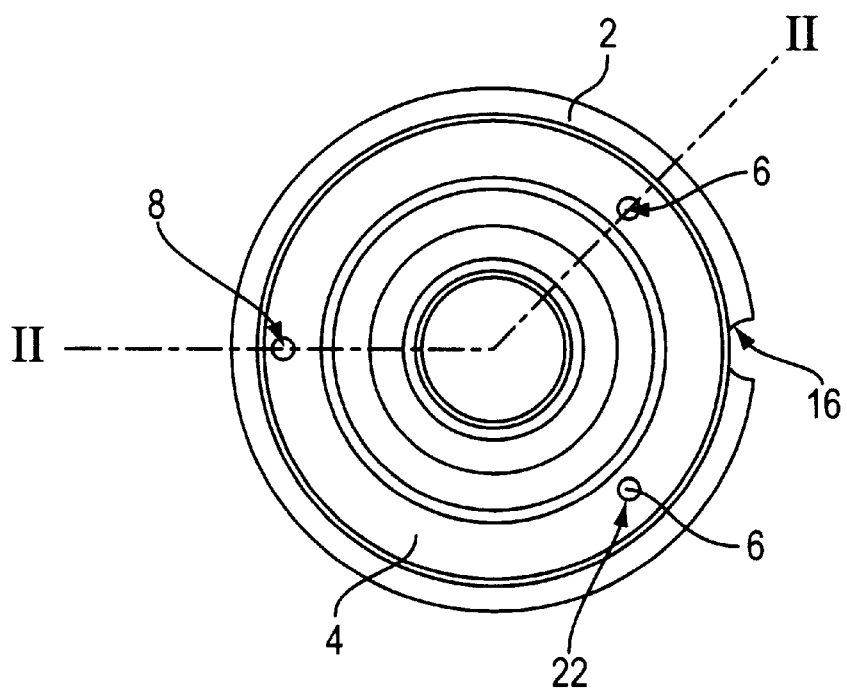
FIG. 1 is a top view of the present invention showing an insulating receptacle connected to a conductive insert, but without a conductive nozzle.
Figure 2:
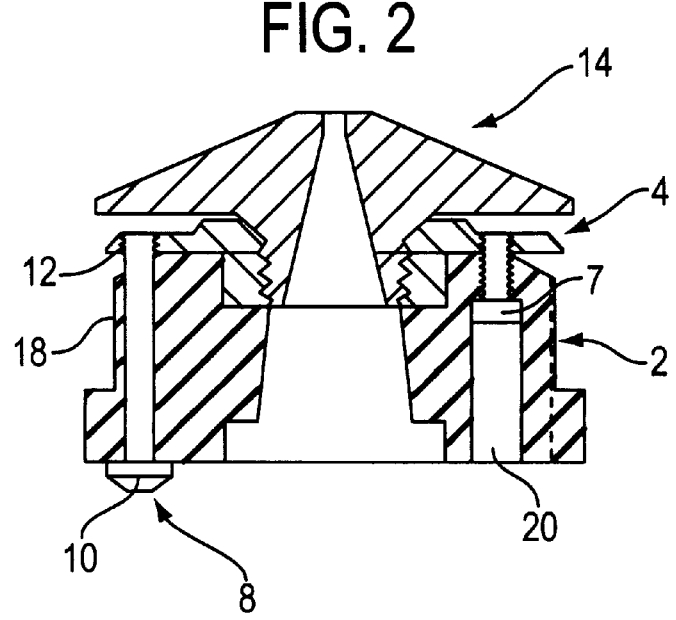
FIG. 2 is a side cross-sectional view of the present invention, taken along line II—II of FIG. 1, showing an insulating receptacle having a conductive insert and a conductive nozzle attached thereto.
Figure 3:
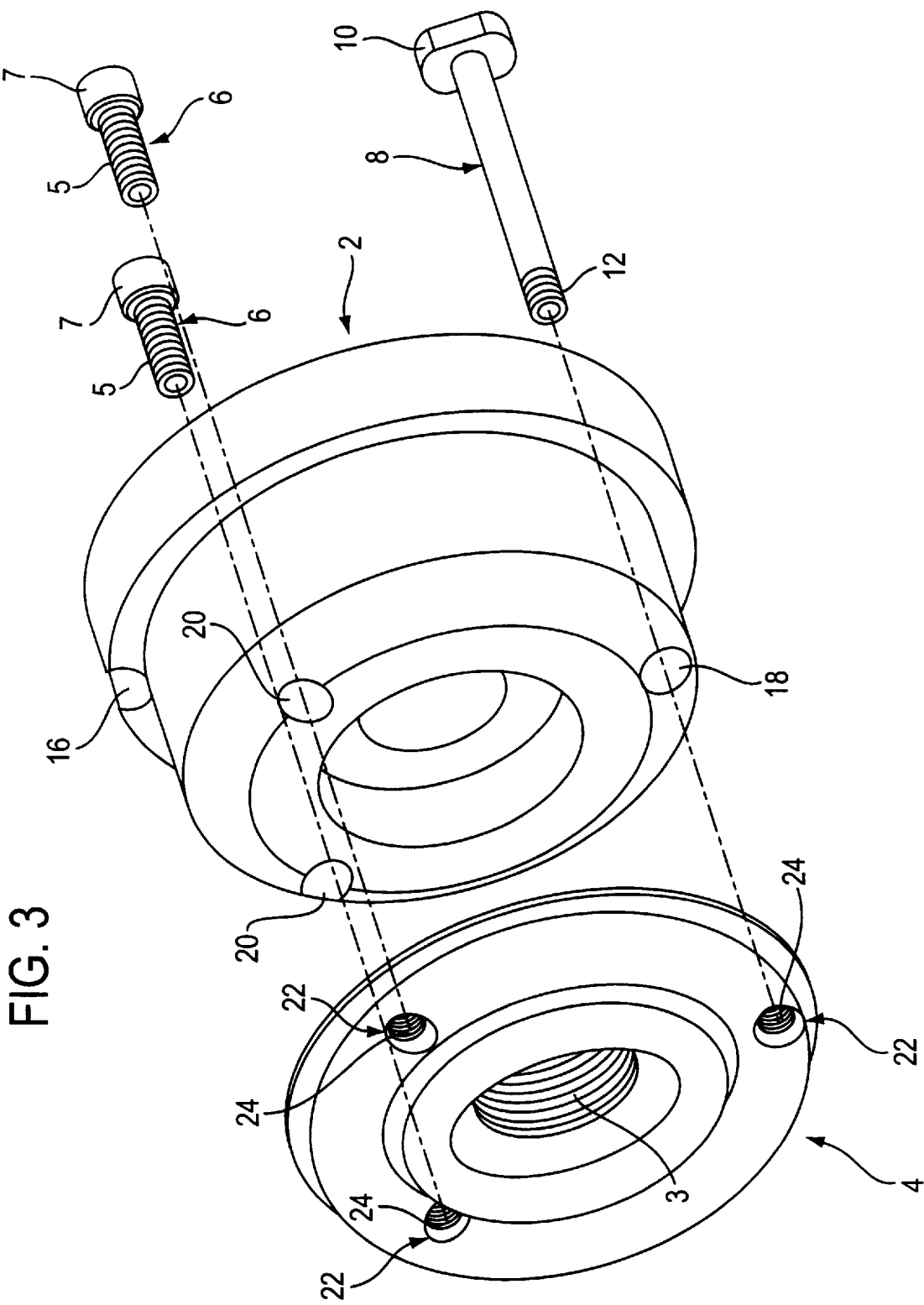
FIG. 3 is an exploded, perspective, view of the present invention.

A preferred embodiment of a nozzle assembly for a laser cutting head, according to the present invention, will now be described with reference to FIGS. 1–3. In general, the nozzle assembly includes an insulating receptacle 2 which is connected to a conductive insert 4 in a removable manner, so that the conductive insert 4 may be replaced. A conductive nozzle 14, of a laser cutting head, is then threaded into the conductive insert 4.

The insulating receptacle 2 may be of any insulating material, such as non-conductive resins, however, ceramics are preferred for their temperature resistance. The conductive insert, and nozzle, are typically made of copper or other metal, but other conductive materials, such as conductive resins may be used.

The insulating receptacle 2 of the present invention includes a generally annular cross section with a central passage therethrough. There is a notch 16, in the base on the bottom of the insulating receptacle 2, for receiving a locking pin of the main body in the laser cutting head. The insulating receptacle 2 further includes a hole 18 therein for insertion of a conductor pin 8. Preferably at least one other hole 20 extends through the insulating receptacle 2 for the insertion of a screw 6. Any number of screw holes 20 can be used. Each screw hole 20 includes a larger portion for receiving the head of a screw, and a smaller portion for receiving the shaft of a screw. The holes 18, 20, are formed through the annular cross section of the insulating receptacle 2.

Preferably, the insulating receptacle 2 includes three holes in its annular cross section; one hole 18 for the conductor pin 8, and two holes 20 for respective screws 6. The three holes are spaced at angular intervals around the annular cross section. Preferably, the angular intervals are equal. Such a configuration provides three points of connection between the insulating receptacle 2 and the conductive insert 4. Yet, the connection can be easily removed by unscrewing the conductor pin 8 and any screws 6.

The conductive insert 4 includes a body portion of generally annular cross section which is seated in the central passage of the insulating receptacle 2. The conductive insert 4 also has a central passage, including a wall, extending therethrough which is in communication with the central passage of the insulating receptacle. The wall of the conductive insert central passage includes threads 3 for receipt of complementary threads on conductive nozzle 14. The conductive nozzle 14 may, however, be connected to the conductive insert 4 by any other suitable method, such as slip fit with a retaining nut or camlock, for example.

The annular body portion of the conductive insert 4 further includes at least one threaded hole 22 therein for receiving the screw threaded end 12 of the conductor pin 8. The threaded hole 22 includes threads 24 which are complementary to those on the threaded end 12 of the conductor pin. The body portion also includes therein additional threaded holes 22, having threads 24, for receiving the threaded shafts 5 of screws 6. There may be two additional threaded holes 22, for example, although any number of holes can be used.

Preferably, the number of threaded holes through the annular body of the conductive insert matches the number of holes through the annular cross section of the insulating receptacle. For example, when two screws 6 are used in conjunction with a conductor pin, there are two holes 20 and one hole 18 through the annular cross section of the insulating receptacle 2, and there are three threaded holes 22 in the annular body portion of the conductive insert 4. Further, the angular intervals at which the threaded holes in the conductive insert 4 are spaced should be such that the threaded holes 22 in the conductive insert 4 are aligned with the holes 18, 20 in the insulating receptacle 2. One way to ensure proper alignment is to space the threaded holes 22 in the conductive insert 4 at the same angular interval as that in which the holes 18, 20 in the insulating receptacle are spaced. Preferably, the three holes 22 in the conductive insert 4, and also in the insulating receptacle 2, are spaced equidistantly around the respective annular cross sections so that a stable connection is formed.

The conductor pin 8 includes a head 10 thereon which abuts the bottom of the insulating receptacle 2, whereas the shaft of the conductor pin extends through hole 18. The end 12 of the conductor pin 8 includes screw threads to mate with complementary screw threads 24 of the threaded holes 22 in the annular body of the conductive insert 4. The head 10 of the conductor pin is used to electrically connect the nozzle assembly to measuring instruments in a body member of the cutting head (not shown). The conductor pin 8 can be made of any electrically conductive material, such as brass, or steel. Also, the head 10 of the conductor pin 8 can include various structures for connection to a typical driving device. For example, the head 10 can include flat spots on the side thereof, as shown.

Each of the screws 6 extends through a respective hole 20 in the insulating receptacle 2. The head 7 of each screw embeds in the insulating receptacle 2 at the junction between the larger and the smaller parts of the hole 20. The threaded shaft 5 of the screw 6 then extends through the smaller portion of the hole 20, and threads into complementary threads 24 of hole 22 in the annular body of the conductive insert 4. The screws 6 can be of any standard type. The screw heads may be configured to mate with any typical driver, as for example, phillips, standard slot, allen, etc. The screw shafts are preferably threaded at the same pitch as the threads at the end of the conductor pin 8, so that the threaded holes 22 in the conductive insert 4 can all be the same, however such is not necessary.

Thus, the conductive insert 4 is attached, in a removable manner, to the insulating receptacle 2 by the conductor pin 8 and screws 6. When the conductive insert 4 wears out through use, or is damaged, it can be replaced simply by unthreading the conductor pin 8 and screws 6 therefrom. A new conductive insert can then be attached to the insulating receptacle. Similarly, if the insulating receptacle is damaged, it can be replaced by removing the screws and conductor pin from the conductive insert, placing the conductive insert on a new insulating receptacle, and then replacing the screws and conductor pin. Furthermore, if the conductor pin wears out, it can be easily replaced without replacing the entire nozzle cutting assembly. Therefore, the present invention reduces operating cost by allowing replacement of only that part which is damaged or worn out.

It is contemplated that numerous modifications may be made to the nozzle assembly for a laser cutting head of the present invention without departing from the spirit and scope of the invention as defined in the following claims.

What is claimed is:

1. A nozzle assembly for a laser cutting head, comprising:
   a receptacle of insulating material having a generally annular cross section with a central passage therethrough, said receptacle of insulating material further including at least one hole through said generally annular cross section;
   a conductive insert having a body portion of generally annular cross section which includes a central passage extending therethrough, said central passage including a wall, said conductive insert further including at least one threaded hole therein, wherein said conductive insert is seated on said receptacle such that said central passages are aligned;

at least one conductive pin having a threaded end and a head opposite said threaded end, said at least one pin extending through said at least one hole in said receptacle so that said head engages said receptacle and said threaded end mates with the threaded hole in said conductive insert thereby forming a connection which holds said receptacle and said conductive insert together in a removable manner.

2. The nozzle assembly according to claim 1, wherein said receptacle includes a plurality of holes and said conductive insert includes a plurality of threaded holes such that the number of holes in said receptacle is equal to the number of threaded holes in said conductive insert.

3. The nozzle assembly according to claim 2, wherein the threaded holes in said conductive insert are spaced at the same angular interval as the holes in said receptacle so that the holes in said conductive insert are aligned with the holes in said receptacle.

4. The nozzle assembly according to claim 2, wherein the number of holes in said receptacle is three.

5. The nozzle assembly according to claim 2, wherein the holes in said receptacle are spaced at an equal distance around said annular cross section.

6. The nozzle assembly according to claim 2, further comprising a screw extending through each of said plurality of holes in said receptacle and in threaded engagement with a respective threaded hole in said conductive insert.

7. The nozzle assembly according to claim 1, wherein the wall of said conductive insert central passage is threaded.

8. The nozzle assembly according to claim 1, wherein said receptacle includes a plurality of holes and said conductive insert includes a plurality of threaded holes.

9. The nozzle assembly according to claim 8, wherein the number of holes in said receptacle is at least equal to the number of threaded holes in said conductive insert.

10. The nozzle assembly according to claim 8, wherein the number of threaded holes in said conductive insert is at least equal to the number of holes in said receptacle.

11. A nozzle assembly for a laser cutting head comprising:

a receptacle of insulating material having a generally annular cross section with a central passage therethrough;

a conductive insert having a body portion of generally annular cross section seated in said receptacle passage and having a central passage extending therethrough, wherein said central passage includes a wall;

means for removably attaching said conductive insert to said receptacle, wherein said means for removably attaching includes at least one screw threaded member which extends through said insulating receptacle and into said conductive insert.

12. The nozzle assembly according to claim 11, wherein said at least one screw threaded member includes a conductor pin and two screws.

13. The nozzle assembly according to claim 11, wherein said at least one screw threaded member engages complementary screw threads in said conductive insert.

14. The nozzle assembly according to claim 8, wherein the wall of said conductive insert central passage is threaded.

* * * * *